United States Patent [19]

Mills

[11] 4,247,329
[45] Jan. 27, 1981

[54] WATER REPELLENT AQUEOUS WOOD CONCENTRATES

[75] Inventor: George B. Mills, St. Louis, Mo.

[73] Assignee: Koppers Company, Inc., Pittsburgh, Pa.

[21] Appl. No.: 134,506

[22] Filed: Mar. 27, 1980

[51] Int. Cl.³ .............................................. C09K 3/18
[52] U.S. Cl. .................................. 106/2; 106/15.05; 106/18.34; 424/137; 424/140; 427/440
[58] Field of Search .................... 424/137, 140; 106/2, 106/15.05, 18.28, 18.34

[56] References Cited

U.S. PATENT DOCUMENTS

| | | | |
|---|---|---|---|
| 3,832,463 | 8/1974 | Nicholson | 106/18.28 |
| 3,957,494 | 5/1976 | Oberley | 424/137 |
| 4,103,000 | 7/1978 | Hartford | 424/140 |

*Primary Examiner*—Lorenzo B. Hayes
*Attorney, Agent, or Firm*—Donald M. MacKay; Herbert J. Zeh, Jr.; Oscar B. Brumback

[57] ABSTRACT

Stable chromated copper arsenate Type B wood preserving concentrates comprising a chromium additive, a copper additive and an arsenic additive with a total of from 5 to 45% oxides and sulfamic acid wherein said copper additive is present in an amount greater than will react with said chromium additive and said sulfamic acid is present in an amount that will inhibit the reaction of the excess copper additive with said arsenic additive.

7 Claims, No Drawings

WATER REPELLENT AQUEOUS WOOD CONCENTRATES

SUMMARY OF THE INVENTION

The present invention is related to concentrates that can be diluted to provide increased decay resistance and/or water repellency for wood and other cellulosic products. More particularly, the invention is related to aqueous cellulosic-treating concentrates having dissolved therein oxides of hexavalent chromium, copper and arsenic with a stabilizing amount of sulfamic acid. The concentrates can be diluted to treat paper, cardboard, wood and cellulosic products generally, but for convenience, the disclosure describes the treatment of wood.

DETAILED DESCRIPTION OF THE INVENTION

Chromated copper arsenate Type B preservatives as defined by the American Wood Preservers' Association must have as active ingredients from 33 to 38% hexavalent chromium as $CrO_3$, from 18 to 22% copper as $CuO$ and from 42 to 48% arsenic as $As_2O_5$. While other ingredients may be included, the above percentages are based upon a three component system.

Compounds according to this invention which can be employed include potassium or sodium dichromate and chromium trioxide to supply the hexavalent chromium; copper sulfamate, copper nitrate, copper fluosilicate, copper fluorborate, basic copper carbonate, copper sulfate and cupric oxide or hydroxide to supply the bivalent copper; and arsenic pentoxide, arsenic acid, sodium arsenate or pyroarsenate to supply the pentavalent arsenic.

When the copper additive is present in more than a stoichiometric amount based on the chromium additive, the excess copper will react with the arsenic additive to form a corrosive gel. Because the CCA Type B concentrates are deficient in chromium oxide sufficient to react with the entire copper additive, the formation of corrosive insoluble gels has been a problem. It is this problem to which this invention is directed.

It has now been discovered that the formation of corrosive insoluble gels can be prevented in CCA Type B concentrates and other solutions containing at least about 5% total oxides of an arsenic additive, a copper additive, and a chromium additive wherein there is insufficiet chromium additive to react with all of the copper additive, by adding sulfamic acid. The amount to be added can be determined empirically but approximates the amount by which there is insufficient chromium additive to react with all of the copper additive. Thus in the 40% concentrate illustrated in the examples (infra) 19.72% chromium trioxide would be required to react with all of the cupric oxide as 2 moles of $CrO_3$ react with 1 mole of $CuO$. Inasmuch as the concentrate was approximately 5% deficient in chromium trioxide, this amount of sulfamic acid was added. It was determined that a range of from about 4% to about 6% sulfamic acid was suitable with an optimum of about 5%. The optimum amount for any composition, however, can be determined by simple experimentation.

Depending on the compounds employed, it may be necessary to add a strong acid in order to solubilize the components of CCA Type B solutions and may, in addition, be employed to provide the desired pH for the solution. Generally, the pH must be between about 0.5 and about 5.0, and is preferably between about 1.2 and 4.3. Typical acids that can be employed to provide the desired pH include sulfamic acid, nitric acid, fluorosilicic acid, fluoroboric acid or a mixture of any of these acids with a minor amount of about 2 percent of phosphoric acid. In order to prepare treating solutions, it is preferred that the compounds added to form the oxides be diluted before mixing as the use of concentrated solutions tend to inhibit the solubilization of the components. Generally it is sufficient to dilute the additive mixtures to about 0.5 to 4 percent oxides.

Any method of treating wood with aqueous treating solutions can be used when wood is treated with the diluted concentrates of the invention. These methods include treating wood by injection of the aqueous wood-treating solution under pressure in closed vessels or dipping in open vessels or by brush or spray painting of the solution. Also, in the method of treating wood with the aqueous wood-treating solution of the present invention, the wood may be end-sealed in any manner known to those skilled in the art to enhance the water repellent effect of the aqueous wood-treating solution.

The following description is directed to an embodiment of the aqueous wood-treating concentrate of the present invention. In this embodiment the preferred aluminum halohydrate used is aluminum chlorohydrate in a 50 percent aqueous solution. Non-limiting examples of such solutions that are commercially available are Wickenol 303 solution, Wickenol 305 solution and Wickeol 306 solution, all available from Wickhen Products, Inc., Huguenot, New York. The Wickenol 303 solution is an aqueous 50 percent aluminum chlorohydrate which has an atomic ratio of two aluminum atoms to one chlorine atom. Other products which have ratios of one aluminum atom to one chlorine atom and intermediate ratios between one and two aluminum atoms to one chlorine atom may also be used. The diluted Wickenol solutions did not appear to exhibit high inherent water repellency when applied to wood by itself, but when used in the aqueous wood-treating solutions described a synergistic effect is obtained, resulting in an increased water repellency in treated wood.

The following example will serve to illustrate preferred embodiments and the best mode of the invention. All parts and percentages in said example and elsewhere in the specification and claims are by weight unless otherwise specified.

| CCA TYPE B Ingredients | Percent by Weight | Percent Oxides | |
|---|---|---|---|
| Chromium trioxide | 14.12 | 14.12 | $CrO_3$ |
| Basic cupric carbonate (55.8% Cu) | 11.22 | 7.84 | $CuO$ |
| 75% Aqueous arsenic acid | 29.71 | 18.04 | $As_2O_5$ |
| Technical sulfamic acid | 5.00 | | |
| Deionized water | 39.95 | | |
| | 100.00% | 40.00% | |

The solution alone and with 3 percent of a Wickenol aluminum chlorohydrate was used to treat southern pine sapwood wafers to assess water repellency. The wafers were vacuum treated with the solution, allowed to air dry and conditioned at 65±5 percent relative humidity and 75°–80° F. for ten days whereupon the water repellencies were determined by 30 minute immersion in deionized water at room temperature by the general procedure of the National Wood Manufacturers Association swellometer test. The results are shown in the following table.

TABLE I

| Aqueous Treating Solutions | Water Repellency Efficiency Based on Reduction of: | | | | | |
|---|---|---|---|---|---|---|
| | Tangential | Swell | | Water Absorption | | |
| | (A) | (B) | (C) | (A) | (B) | (C) |
| 1. 1% Oxide CCA-B alone | 7 ± 2 | 4 | | −22 ± 0 | −20 | |
| 2. #1 including 3% Wickenol (D) 303 | 56 ± 1 | 66 | | 72 ± 2 | 72 | |
| 3. #1 including 3% Wickenol 305 | 43 ± 1 | 50 | | 60 ± 1 | 51 | |
| 4. #1 including 3% Wickenol 306 | 50 ± 1 | 63 | | 68 ± 2 | 65 | |
| 5. 1.6 Wickenol 303 | | | −1 | | | −14 |
| 6. 1.6 Wickenol 305 | | | −1 | | | −10 |
| 7. 3% Wickenol 303 | | 5 | | | 27 | |

(A) Indicates wafers from boards with 36.5 pcf density at 11-12% M.C. (moisture content) used in duplicates treated to about 37.5 pcf of solution.
(B) Indicates single wafers from boards with 37.2 pcf density at 11-12% M.C. treated to about 42 pcf of solution.
(C) Indicates single wafers from boards with 38.39 pcf of solution.
(D) Wickenol is a trade name for aluminum chlorohydrate.

From the data it can be seen that the water repellency is considerably increased with the addition of aluminum halohydrate as compared with a standard type solution.

What is claimed:

1. An aqueous cellulosic concentrate comprising in an acid medium a chromium additive, a copper additive and an arsenic additive wherein the active ingredient is $CrO_3$, $CuO$ and $As_2O_5$ respectively with a total from 5 to 45% of oxides, and sulfamic acid wherein said copper additive is present in an amount greater than will react with said chromium additive and said sulfamic acid is present in an amount that will inhibit the reaction of the excess copper additive with said arsenic additive.

2. The concentrate of claim 1 wherein the chromium additive and sulfamic acid combined are substantially stoichiometrically equivalent to the copper additive.

3. The concentrate of claim 1 containing from 33 to 38% hexavalent chromium as $CrO_3$, from 18 to 22% copper as $CuO$, from 42 to 48% arsenic as $As_2O_5$, and from about 4% to about 6% of sulfamic acid.

4. The concentrate of claim 1 wherein the copper additive is basic cupric carbonate.

5. The concentrate of claim 1 wherein the arsenic additive is arsenic acid.

6. The concentrate of claim 1 wherein the chromium additive is $CrO_3$.

7. In a method for forming a stable aqueous cellulosic-treating concentrate comprising a chromium additive, a copper additive, and an arsenic additive with a total of from 5 to 45% oxides and wherein said copper additive is present in an amount greater than will react with said chromium additive, the improvement comprising adding sufficient sulfamic acid to react with the excess copper additive so as to inhibit reaction between the arsenic additive and the copper additive.

* * * * *